US012670786B2

(12) United States Patent
Tozawa et al.

(10) Patent No.: US 12,670,786 B2
(45) Date of Patent: Jun. 30, 2026

(54) INTRODUCTION SUPPORT APPARATUS OF PEDESTRIAN-VEHICLE SEPARATED SIGNAL CONTROL, INTRODUCTION SUPPORT METHOD, AND NON-TRANSITORY COMPUTER READABLE MEDIUM STORING PROGRAM

(71) Applicant: NEC Corporation, Tokyo (JP)

(72) Inventors: Nobuyuki Tozawa, Tokyo (JP); Ryota Horiguchi, Tokyo (JP); Morihisa Iijima, Tokyo (JP)

(73) Assignee: NEC CORPORATION, Tokyo (JP)

( * ) Notice: Subject to any disclaimer, the term of this patent is extended or adjusted under 35 U.S.C. 154(b) by 41 days.

(21) Appl. No.: 18/722,779

(22) PCT Filed: Dec. 28, 2021

(86) PCT No.: PCT/JP2021/048879
§ 371 (c)(1),
(2) Date: Jun. 21, 2024

(87) PCT Pub. No.: WO2023/127129
PCT Pub. Date: Jul. 6, 2023

(65) Prior Publication Data
US 2025/0054386 A1 Feb. 13, 2025

(51) Int. Cl.
*G08G 1/081* (2006.01)
*G08G 1/005* (2006.01)
*G08G 1/01* (2006.01)

(52) U.S. Cl.
CPC ............ *G08G 1/081* (2013.01); *G08G 1/005* (2013.01); *G08G 1/0145* (2013.01)

(58) Field of Classification Search
CPC ....... G08G 1/081; G08G 1/005; G08G 1/0145
See application file for complete search history.

(56) References Cited

U.S. PATENT DOCUMENTS

2017/0186314 A1* 6/2017 Bernhardt ............... H04L 67/12

FOREIGN PATENT DOCUMENTS

CN 109949585 A * 6/2019
JP 2001-236593 A 8/2001
(Continued)

OTHER PUBLICATIONS

International Search Report for PCT/JP2021/048879 dated Mar. 1, 2022 (PCT/ISA/210).

*Primary Examiner* — Steven Lim
*Assistant Examiner* — James E Munion
(74) *Attorney, Agent, or Firm* — Sughrue Mion, PLLC

(57) ABSTRACT

An introduction support apparatus (10) of pedestrian-vehicle separated signal control according to the present disclosure includes: a data acquisition unit (11) configured to acquire data regarding movements of vehicles and pedestrians within a measurement zone of an intersection that is a candidate for introduction of pedestrian-vehicle separated signal control; a first calculation unit (12) configured to calculate a first evaluation index indicating a degree to which the movements of the vehicles in the intersection are impeded by the pedestrians based on the data acquired from the data acquisition unit (11); and an evaluation unit (13) configured to obtain an evaluation value for evaluating whether or not to introduce the pedestrian-vehicle separated signal control based on the first evaluation index.

16 Claims, 7 Drawing Sheets

(56) References Cited

FOREIGN PATENT DOCUMENTS

| | | | | | |
|---|---|---|---|---|---|
| JP | 2006106955 | A | * | 4/2006 | |
| JP | 2011-192050 | A | | 9/2011 | |
| JP | 2012178033 | A | * | 9/2012 | |
| KR | 20130066389 | A | * | 6/2013 | ............ G08G 1/095 |

* cited by examiner

INTRODUCTION SUPPORT APPARATUS OF PEDESTRIAN-VEHICLE SEPARATED SIGNAL CONTROL, INTRODUCTION SUPPORT METHOD, AND NON-TRANSITORY COMPUTER READABLE MEDIUM STORING PROGRAM

CROSS REFERENCE TO RELATED APPLICATIONS

This application is a National Stage of International Application No. PCT/JP2021/048879 filed Dec. 28, 2021.

TECHNICAL FIELD

The present disclosure relates to an introduction support apparatus of pedestrian-vehicle separated signal control, an introduction support method, and a non-transitory computer readable medium storing a program.

BACKGROUND ART

Various techniques for determining a cause of a congestion in an intersection have been proposed. Patent Literature 1 discloses a congestion determination apparatus for determining a cause of a congestion in an intersection by acquiring vehicle information transmitted and received by inter-vehicle communication performed by vehicles traveling in a required range of communication including an intersection. In Patent Literature 1, when the speed of vehicles which are about to turn left during a time when the color of a traffic light for pedestrians is green is lower than the speed of these vehicles traveling during a time when the color of the traffic light for pedestrians is red, it is determined that a left-turn congestion, which occurs due to encountering of vehicles turning left with pedestrians, is occurring, and then the time during which the color of the traffic light for pedestrians is red is extended.

CITATION LIST

Patent Literature

[Patent Literature 1] Japanese Unexamined Patent Application Publication No. 2011-192050

SUMMARY OF INVENTION

Technical Problem

In order to optimize traffic controlling capacity in intersections, various types of signal control have been employed. The time proportion at which each path flowing into an intersection should be granted the right to pass is generally determined according to the volume of traffic flowing into the intersection. The right to pass granted to the traffic flow is referred to as an “indication”.

As a measure to reduce the number of accidents between self-driving vehicles and pedestrians, pedestrian-vehicle separated signal control for temporally separating the vehicle traffic from the pedestrian traffic has been focused upon. The pedestrian-vehicle separated signal control requires, for example, three indications, namely, a “first bidirectional indication” to grant the right to pass to inbound and outbound inflow paths in a predetermined direction, a “second bidirectional indication” that grants the right to pass to inbound and outbound inflow paths in its crossing direction, and an “indication for pedestrians” that grants the right to pass to only pedestrians.

It is said that the pedestrian-vehicle separated signal control causes a congestion to be worsened because, in this control, a time for impeding movements of vehicles is set for a certain period of time in a cycle of the signal control. Nevertheless, it will be preferable to employ the pedestrian-vehicle separated signal control in some intersections so that the traffic will become smoother. In an intersection, for example, where a pedestrian traffic volume in a crosswalk is large and vehicles turning right or left are forced to stop due to the crossing of pedestrians, it may be advantageous to employ the pedestrian-vehicle separated signal control.

In Patent Literature 1, when it is determined that a left-turn congestion, which occurs due to encountering of vehicles turning left with pedestrians, is occurring, the time during which the color of the traffic light for pedestrians is red is simply extended, introduction of pedestrian-vehicle separated signal control not being taken into consideration.

An object of the present disclosure is to provide an introduction support apparatus that supports introduction of pedestrian-vehicle separated signal control, an introduction support method, and a non-transitory computer readable medium storing a program in which encountering of vehicles with pedestrians is taken into consideration.

Solution to Problem

An introduction support apparatus of pedestrian-vehicle separated signal control according to one aspect introduction support apparatus of pedestrian-vehicle separated signal control, the introduction support apparatus including: data acquisition means for acquiring data regarding movements of vehicles and pedestrians within a measurement zone of an intersection that is a candidate for introduction of pedestrian-vehicle separated signal control; first calculation means for calculating a first evaluation index indicating a degree to which the movements of the vehicles in the intersection are impeded by the pedestrians based on the data acquired from the data acquisition means; and evaluation means for obtaining an evaluation value for evaluating whether or not to introduce the pedestrian-vehicle separated signal control based on the first evaluation index.

An introduction support method of pedestrian-vehicle separated signal control according to one aspect is an introduction support method executed by a pedestrian-vehicle separated signal control introduction support apparatus, the introduction support method including: acquiring data regarding movements of vehicles and pedestrians within a measurement zone of an intersection that is a candidate for introduction of pedestrian-vehicle separated signal control; calculating a first evaluation index indicating a degree to which the movements of the vehicles in the intersection are impeded by the pedestrians based on the acquired data; and obtaining an evaluation value for evaluating whether or not to introduce the pedestrian-vehicle separated signal control based on the first evaluation index.

A non-transitory computer readable medium according to one aspect stores a program for causing a computer to execute processing for: acquiring data regarding movements of vehicles and pedestrians within a measurement zone of an intersection that is a candidate for introduction of pedestrian-vehicle separated signal control; calculating a first evaluation index indicating a degree to which the movements of the vehicles in the intersection are impeded by the pedestrians based on the acquired data; and obtaining an evaluation value for evaluating whether or not to introduce the pedestrian-vehicle separated signal control based on the first evaluation index.

Advantageous Effects of Invention

According to the aforementioned aspects, it is possible to provide an introduction support apparatus for supporting introduction of pedestrian-vehicle separated signal control, an introduction support method, and a non-transitory computer readable medium storing a program in which encountering of vehicles with pedestrians is taken into consideration.

EXAMPLE EMBODIMENT

Hereinafter, with reference to the drawings, an example embodiment of the present disclosure will be described. Note that the following descriptions and the drawings are omitted and simplified as appropriate for the clarification of explanation. Further, in each drawing, the same elements have the same reference signs, and repeated descriptions are omitted as appropriate. Further, specific numerical values and the like shown below are only illustrations for facilitate understanding of the present disclosure, and they are not limited to those shown below.

The example embodiment relates to an introduction support apparatus of pedestrian-vehicle separated signal control for temporally separating vehicle traffic from pedestrian traffic. The pedestrian-vehicle separated signal control is a system for repeating three indications: a "first bidirectional indication" which grants the right to pass to inbound and outbound inflow paths in a predetermined direction, a "second bidirectional indication" which grants the right to pass to inbound and outbound inflow paths in its crossing direction, and an "indication for pedestrians" which grants the right to pass to only pedestrians. The introduction support apparatus according to the example embodiment evaluates whether or not it is necessary to introduce the pedestrian-vehicle separated signal control in intersections where this control has not been employed.

Figure 1:
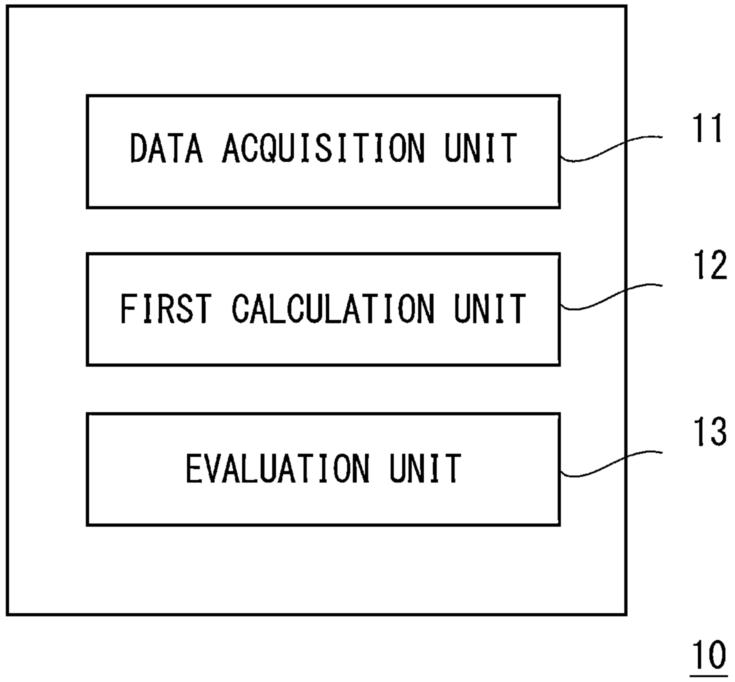
FIG. 1 is a block diagram showing a configuration of an introduction support apparatus of pedestrian-vehicle separated signal control according to an example embodiment.

FIG. 1 is a block diagram showing a configuration of an introduction support apparatus 10 of the pedestrian-vehicle separated signal control according to the example embodiment. As shown in FIG. 1, the introduction support apparatus 10 includes a data acquisition unit 11, a first calculation unit 12, and an evaluation unit 13. The data acquisition unit 11, which corresponds to data acquisition means, acquires data regarding movements of vehicles and pedestrians in an intersection that is a candidate for introduction of pedestrian-vehicle separated signal control.

The first calculation unit 12 corresponds to first calculation means and calculates a first evaluation index indicating a degree to which movements of vehicles in an intersection are impeded by pedestrians based on the data acquired from the data acquisition unit 11. The evaluation unit 13, which corresponds to evaluation means, obtains an evaluation value for evaluating whether or not to introduce the pedestrian-vehicle separated signal control based on the first evaluation index.

As described above, according to the example embodiment, it is possible to evaluate whether or not it is necessary to introduce pedestrian-vehicle separated signal control taking into consideration encountering of vehicles with pedestrians.

Figure 2:
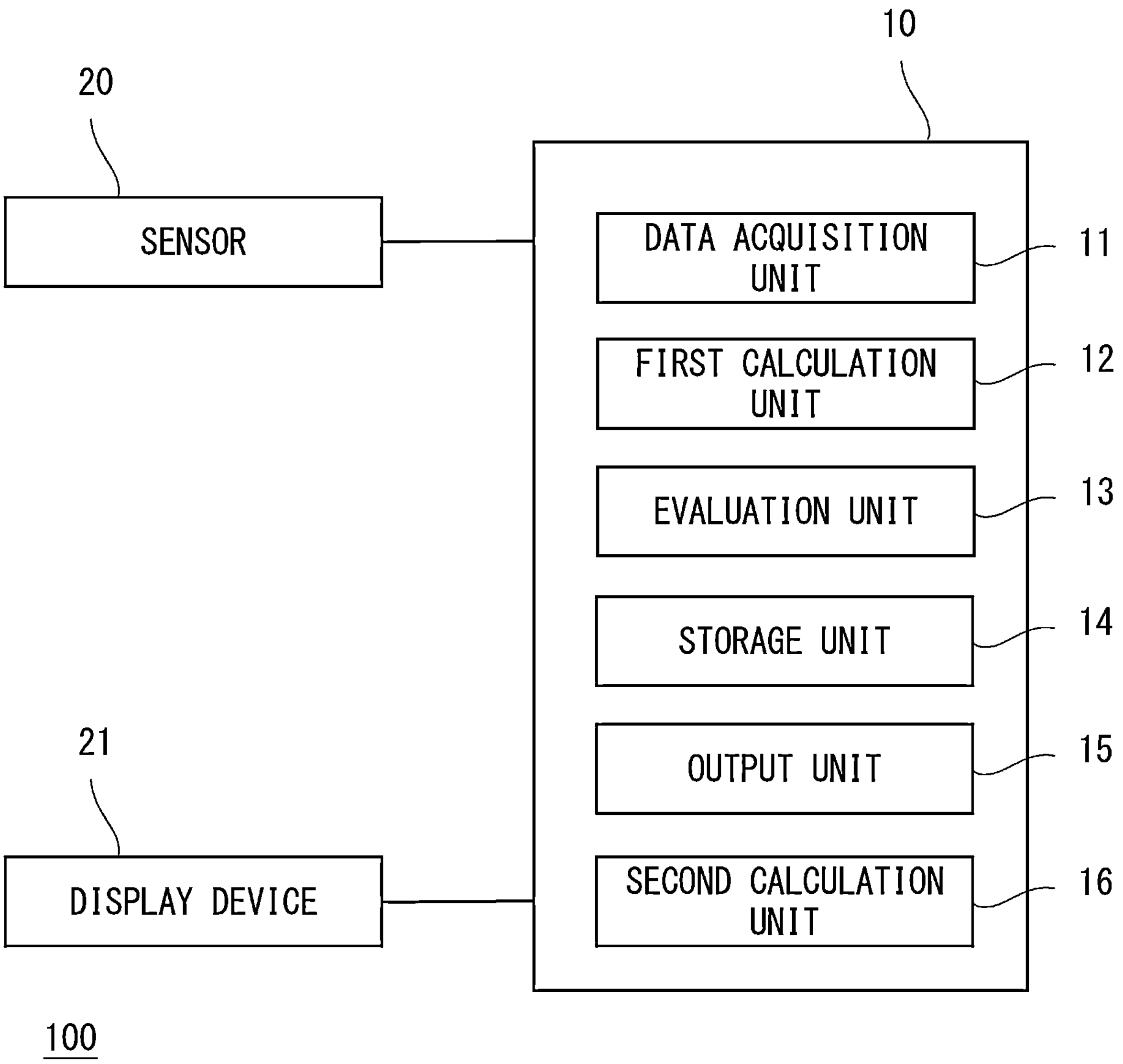
FIG. 2 is a block diagram showing a configuration of an introduction support system using the introduction support apparatus of the pedestrian-vehicle separated signal control according to the example embodiment.

Hereinafter, with reference to the drawings, specific example embodiments will be described. FIG. 2 is a block diagram showing a configuration of an introduction support system 100 using the introduction support apparatus 10 of the pedestrian-vehicle separated signal control according to the example embodiment. FIG. 2 shows, besides a hardware configuration of the introduction support system 100, a logical function block implemented in the introduction support apparatus 10. As shown in FIG. 2, the introduction support system 100 includes the introduction support apparatus 10, a sensor 20, and a display device 21.

Figure 3:
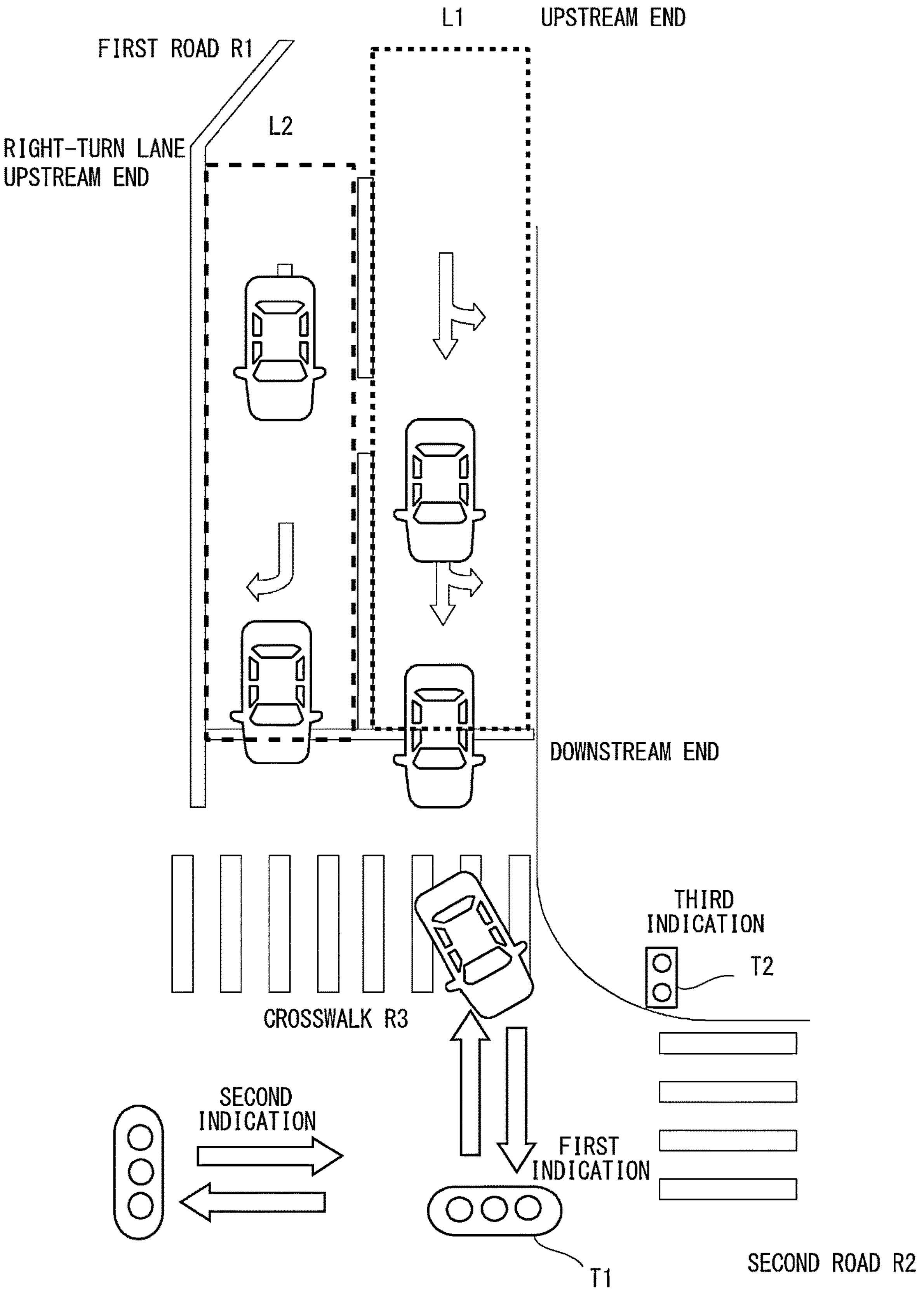
FIG. 3 is a diagram showing one example of an intersection that is a candidate for the introduction of the pedestrian-vehicle separated signal control.
Figure 5:
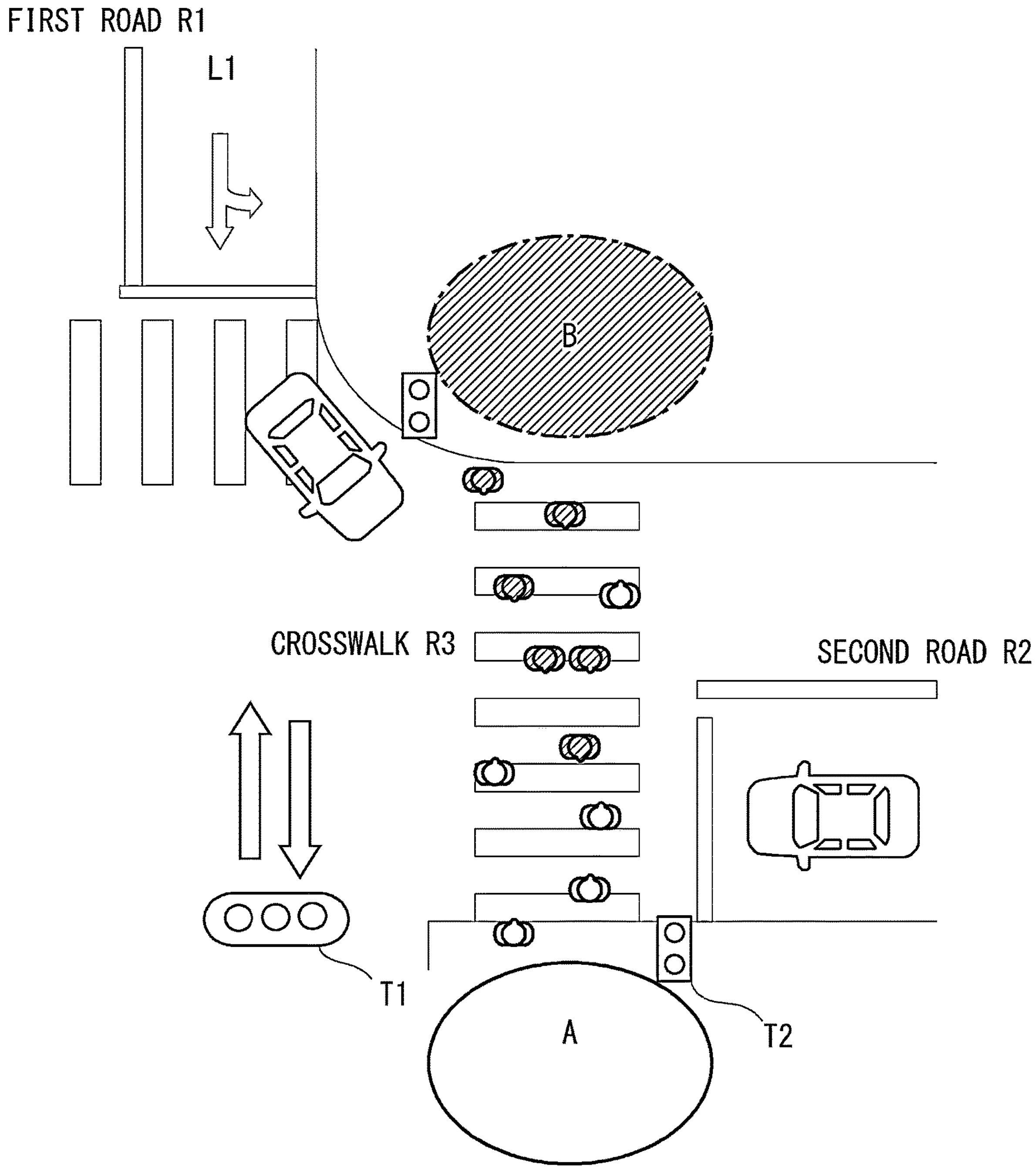
FIG. 5 is a diagram showing a crosswalk shown in FIG. 3 in more detail.

Referring now to FIGS. 3 and 5, an intersection in which the introduction support system 100 according to the example embodiment is installed will be described. FIG. 3 is a diagram showing one example of an intersection that is a candidate for the introduction of pedestrian-vehicle separated signal control. FIG. 5 is a diagram showing a crosswalk in FIG. 3 in more detail.

It is assumed, in this example embodiment, that a first road R1 and a second road R2 cross each other at an intersection and crosswalks R3 are provided so as to cross the first road R1 and the second road R2. It is further assumed that the first road R1 has two lanes in each direction and the second road R2 has one lane in each direction. For the sake of simplification, FIG. 3 shows, regarding the first road R1, only two lanes (a first lane L1 and a second lane L2) in one direction, which is a direction toward the bottom of the paper. It is assumed that the first lane L1 is a left-turn, straight-through shared lane (hereinafter this lane will be referred to as a left/straight shared lane) and the second lane L2 is a right-turn-only lane. Further, FIG. 5 shows a state in which a vehicle coming along the first lane L1 and turning left stops in front of the crosswalk R3 since pedestrians are crossing the crosswalk R3.

A traffic light for vehicles T1 is installed in an upper part of a pole or the like installed on a roadside in such a way that the traffic light for vehicles T1 is opposed to the traffic of vehicles traveling along the road. Note that the traffic light for vehicles T1 includes the one intended for vehicle traffic of the first road R1 and the one intended for vehicle traffic of the second road R2.

The traffic light for pedestrians T2 is installed in the upper part of a pole or the like that is installed on a roadside of each end of the crosswalk 3 in such a way that the traffic light for pedestrians T2 is opposed to the pedestrians passing the crosswalk 3. It is assumed that, in this intersection, two indications: a "first indication" that grants the right to pass to vehicles and pedestrians on the inbound and outbound first road R1 in a predetermined direction and a "second indication" that grants the right to pass to vehicles and pedestrians on the inbound and outbound second road R2 in its crossing direction are repeated. It is assumed that this signal control system is called a standard 2 indication.

It is assumed that, in this intersection, when the pedestrian-vehicle separated signal control is introduced, for example, three indications: a green light for vehicles on the first road R1, a green light for vehicles on the second road R2, and a green light for pedestrians of all the crosswalks R3 crossing the first road R1 and the second road R2 are alternately repeated.

In the above intersection, in the case of the standard 2 indication, in the first lane L1, which is the left/straight shared lane, and the second lane L2, which is the right-turn-only lane, vehicles which are about to turn right or left may stop due to encountering with pedestrians crossing the crosswalks. If a vehicle waiting to turn left blocks the left/straight shared lane (first lane L1), the presence of this vehicle impedes the passage of the following vehicles traveling straight and thus the following vehicles cannot pass through the intersection. Further, if a congestion occurs in the right-turn-only lane and the line of vehicles waiting to turn right is extended to the first lane L1 beyond the length of the right-turn-only lane (second lane L2) and blocks the first lane, a situation in which the following vehicles traveling straight ahead and vehicles which are about to turn left are impeded occurs.

The sensor 20 measures positions of vehicles and people in the measurement zone including an intersection that is a candidate for introduction of pedestrian-vehicle separated signal control in the case of the standard 2 indication, and detects movements of vehicles and pedestrians. The sensor 20 may be, for example, a camera or a radar that images the measurement zone from above. The sensor 20 may be installed, for example, on a pole installed on the roadside of the measurement zone or in an upper part of a surrounding structure. Note that a plurality of sensors 20 may be installed so that the entire measurement zone can be detected at the same time.

Further, the sensor 20 measures the number of vehicles traveling a predetermined place in the roadway included in the measurement zone per unit time (hereinafter it will be referred to as a vehicle traffic volume). That is, the sensor 20 detects the number of vehicles that enter the intersection. Further, the sensor 20 is able to measure the number of vehicles waiting at the traffic light for vehicles T1 when this traffic light is a vehicle red indication (stop indication).

Further, the sensor 20 measures the number of pedestrians who pass a predetermined place in the crosswalk per unit time (hereinafter it will be referred to as a pedestrian traffic volume) included in the measurement zone. Further, the sensor 20 is able to measure the number of people waiting at a traffic light in each of areas A and B at each end of the crosswalk R3 shown in FIG. 5.

The sensor 20 and the introduction support apparatus 10 are connected to each other in such a way that data can be communicated by wired or wireless communication. The data regarding movements of vehicles and pedestrians detected by the sensor 20 is transmitted to the introduction support apparatus 10.

The introduction support apparatus 10 includes a data acquisition unit 11, a first calculation unit 12, an evaluation unit 13, a storage unit 14, an output unit 15, and a second calculation unit 16. The introduction support apparatus 10 is, for example, an arithmetic processing apparatus such as a Central Processing Unit (CPU) or a Graphics Processing Unit (GPU). The data acquisition unit 11 acquires data regarding movements of vehicles and pedestrians transmitted from the sensor 20.

The first calculation unit 12 calculates, based on the data acquired from the data acquisition unit 11, a first evaluation index indicating a degree to which movements of vehicles in an intersection which is a candidate to be introduced are impeded by pedestrians. Here, "a movement of a vehicle is impeded by a pedestrian" indicates a situation in which a vehicle which is about to turn right or left in an intersection is forced to stop because the vehicle which is about to turn right or left encounters pedestrians crossing the crosswalk. Further, it is preferable to set the first evaluation index taking into consideration, besides a degree to which vehicles which are about to turn right or left but have to stop in front of the pedestrians since the vehicles are impeded from turning right or left, a degree to which vehicles traveling straight ahead are impeded by the presence of vehicles waiting to turn left, and a degree to which vehicles traveling straight ahead are impeded by the presence of vehicles that wait to turn right and are extended beyond the right-turn-only lane.

The first evaluation index is calculated, for example, based on statistics regarding an amount of a waiting time that vehicles which are about to turn right or left in an intersection have to wait because they are impeded from turning right or left due to the presence of pedestrians crossing a crosswalk in a predetermined period of time. In general, the waiting time for vehicles which are about to turn right or left after introduction of the pedestrian-vehicle separated signal control is the same as or becomes longer than that before the introduction. However, it is possible that the waiting time can be reduced if there is no waiting time for the vehicles traveling straight ahead that follow the vehicles which are about to turn right or left.

The first evaluation index preferably includes, besides a waiting time for vehicles which are about to turn right or left due to pedestrian-vehicle encountering, a waiting time for vehicles traveling straight ahead but stuck in a queue of vehicles that follow the vehicle that stops due to pedestrian-vehicle encountering, and a waiting time for vehicles traveling straight ahead that are impeded from traveling due to overflow of vehicles from the right-turn-only lane.

The first evaluation index may be a total waiting time, an average value, the maximum value, the minimum value or the like of the waiting time in a predetermined period of time depending on the purpose. Further, the statistics regarding the amount of the waiting time may also include a proportion of the time during which vehicles are stopped by pedestrians or the like to the time for a vehicle green indication (traveling allowed) in one cycle as well. The predetermined period of time may be, for example, any length of time such as one day, one week, one month, or any time zone in which a vehicle traffic volume or a pedestrian traffic volume increases.

The evaluation unit 13 obtains the evaluation value for evaluating whether or not to introduce the pedestrian-vehicle separated signal control based on the first evaluation index. When, for example, the total waiting time in a predetermined period of time satisfies a predetermined condition, the evaluation unit 13 may set the evaluation value to be large. When, for example, the total waiting time in a predetermined period of time is equal to or smaller than a predetermined threshold, the evaluation unit 13 may set the evaluation value to be large. In the example embodiment, the higher the evaluation value, the higher the degree of recommendation of introduction of the pedestrian-vehicle separated signal control in this intersection (hereinafter it will be referred to as a degree of recommendation). The "evaluation value being high" means that desirable effects when the pedestrian-vehicle separated signal control is introduced exceed undesirable effects in a target intersection. The evaluation value can be expressed, for example, by a method in which the higher the degree of recommendation, the higher the value on a 10-point scale.

The storage unit 14 is, for example, a nonvolatile storage device such as a Hard Disk Drive (HDD), a Solid State Drive (SSD), or a flash memory. The storage unit 14 stores a program for implementing each function of the components included in the introduction support apparatus 10. The introduction support apparatus 10 executes this program, whereby each function of the components included in the introduction support apparatus 10 is implemented.

The storage unit 14 may include a memory such as a Random Access Memory (RAM) or a Read Only Memory (ROM). When the information processing apparatus 1 executes the aforementioned programs, these programs may be loaded onto the memory and the loaded programs may be executed, or these programs may be executed without being loaded onto the memory. Further, the storage unit 14 also serves to store information held by the components included in the introduction support apparatus 10, such as the data acquired from the data acquisition unit 11, information that is necessary for the first calculation unit 12 and the evaluation unit 13 to perform the above operations, etc.

The output unit 15 outputs a display signal including the evaluation value or the like obtained by the evaluation unit 13 to the display device 21. The display device 21 is, for example, a Liquid Crystal Display (LCD) or the like, and displays various kinds of information including the evaluation value according to the display signal obtained from the output unit 15. An administrator of the introduction support system 100 is able to determine whether or not to introduce the pedestrian-vehicle separated signal control in an intersection that is a candidate for the introduction taking into consideration encountering of vehicles with pedestrians by referring to the evaluation value displayed on the display device 21.

Further, in the example shown in FIG. 2, the second calculation unit 16 is further included. The second calculation unit 16, which corresponds to second calculation means, calculates a second evaluation value when the pedestrian-vehicle separated signal control is introduced in an intersection that is a candidate for the introduction by a traffic flow simulation. As the traffic flow simulation, for example, various kinds of known techniques for generating a transition of a virtual traffic condition when the pedestrian-vehicle separated signal control is introduced in an intersection that is a candidate for the introduction using a traffic flow model can be employed.

The second calculation unit 16 is able to generate a traffic flow model that is necessary for the traffic flow simulation based on various parameters and execute the traffic flow simulation. The traffic flow model includes, for example, a road model (overall road information such as the length and the width of the road, the number of lanes, or connections), a vehicle model (information such as the average speed for each type of car, a path for each vehicle, a time of occurrence, and so on), a pedestrian model (information such as the average speed for each type of pedestrian, a path for each pedestrian, a time of occurrence, and so on), a signal model (information such as association of a signal with an intersection, a lighting time, or a lighting pattern), or the like. This traffic flow model is also stored in the storage unit 14.

Various parameters that are necessary to construct the traffic flow model will be described. The various parameters include respective parameters for constructing the signal model, the vehicle model, and the pedestrian model.

The parameters for constructing the signal model include indication step patterns including a cycle length and a split. The cycle length means a time of one cycle from a time when a traffic light turns green to a time when the traffic light turns green next time. The split means a proportion of the length of time allocated to each indication to the cycle length. The indication step patterns are signal control patterns for defining whether each of the traffic light for vehicles T1 and the traffic light for pedestrians T2 should be turned on or off for each step in one cycle. The second calculation unit 16 is able to acquire the actual indication step pattern in an intersection that is a candidate for the introduction and construct a signal model.

Figure 4:
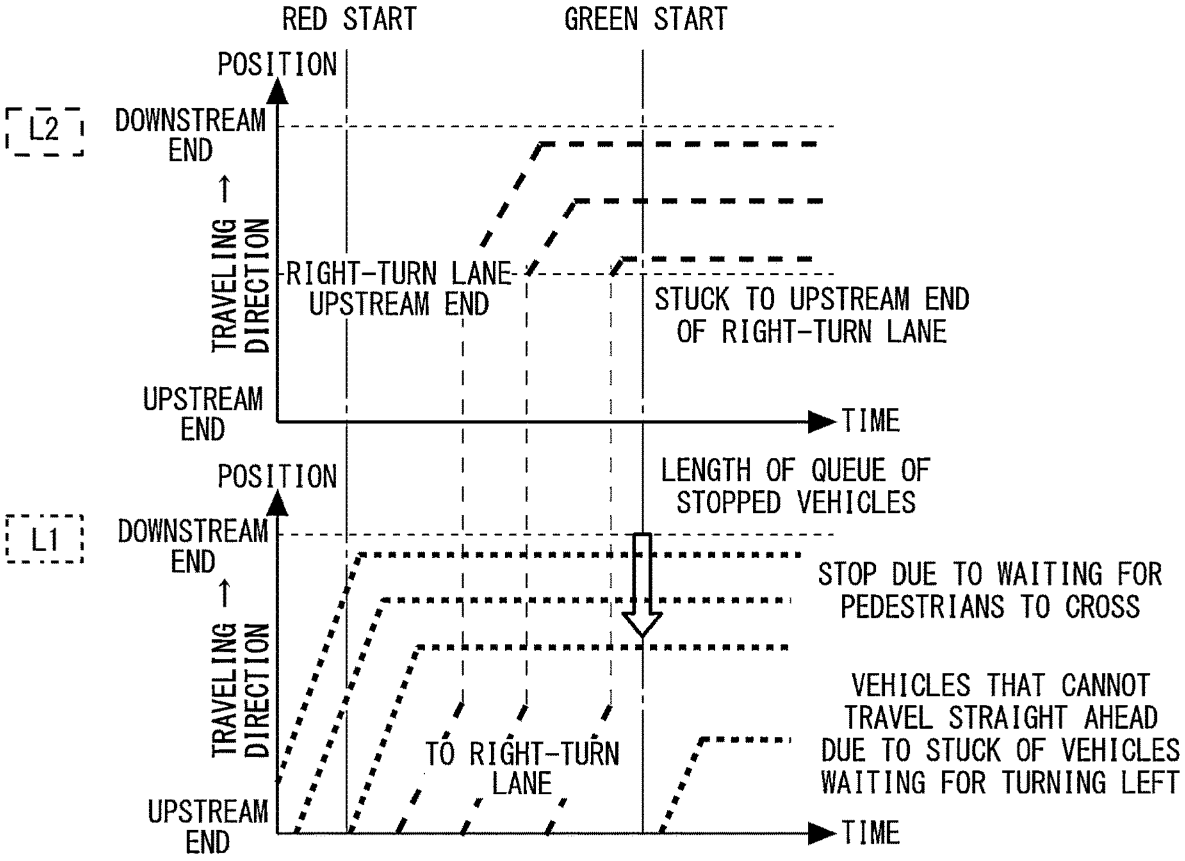
FIG. 4 is a time-space trajectory diagram of a vehicle in a roadway shown in FIG. 3.

The parameters for constructing the vehicle model include a vehicle traffic volume for each cycle, a length of a queue of stopped vehicles, a waiting time, and so on. FIG. 4 is a time-space trajectory diagram of vehicles in each of the lanes L1 and L2 in FIG. 3. As described above, FIG. 4 shows an example in which the first lane L1 is a left/straight shared lane and the second lane L2 is a right-turn-only lane. For the sake of description, the number of vehicles shown in FIG. 4 is different from that shown in FIG. 3.

In FIG. 4, the horizontal axis indicates a time and the vertical axis indicates changes in positions of vehicles over time. The vertical axis indicates the traveling direction of the vehicles from the bottom to the top. When the area where the parameters are measured is defined as an intersection inflow part, the vertical axis indicates a position from an upstream end to a downstream end of the intersection inflow part. It is assumed that the downstream end indicates a position of a stop line in front of the intersection.

By referring to FIG. 4, it is possible to acquire various kinds of parameters regarding vehicles in the actual measurement zone in the target intersection. For example, the vehicle traffic volume for each cycle may be measured for each lane, each traveling direction, and each type of car. Further, a time required for each vehicle to pass the intersection, a time that is required to pass from the upstream end to the downstream end of the intersection inflow part and the like may be acquired. Referring to the time-space trajectory diagram of the first lane L1, three vehicles are waiting for the traffic light to turn before the traffic light turns green. The number of vehicles that stop before the traffic light turns green is the length of the queue of stopped vehicles.

Further, referring to the time-space trajectory diagram of the first lane L1, the waiting time for waiting for pedestrians crossing the crosswalk to pass is acquired when a vehicle turns left. Further, referring to the time-space trajectory diagram of the second lane L2, when a vehicle turns right, a time for waiting for oncoming straight-traveling vehicles to pass and a time for waiting for pedestrians crossing the crosswalk installed just before the vehicle turns right to pass are acquired. The second calculation unit 16 may acquire these parameters in an intersection that is a candidate for the introduction and construct the vehicle model.

Figure 6:
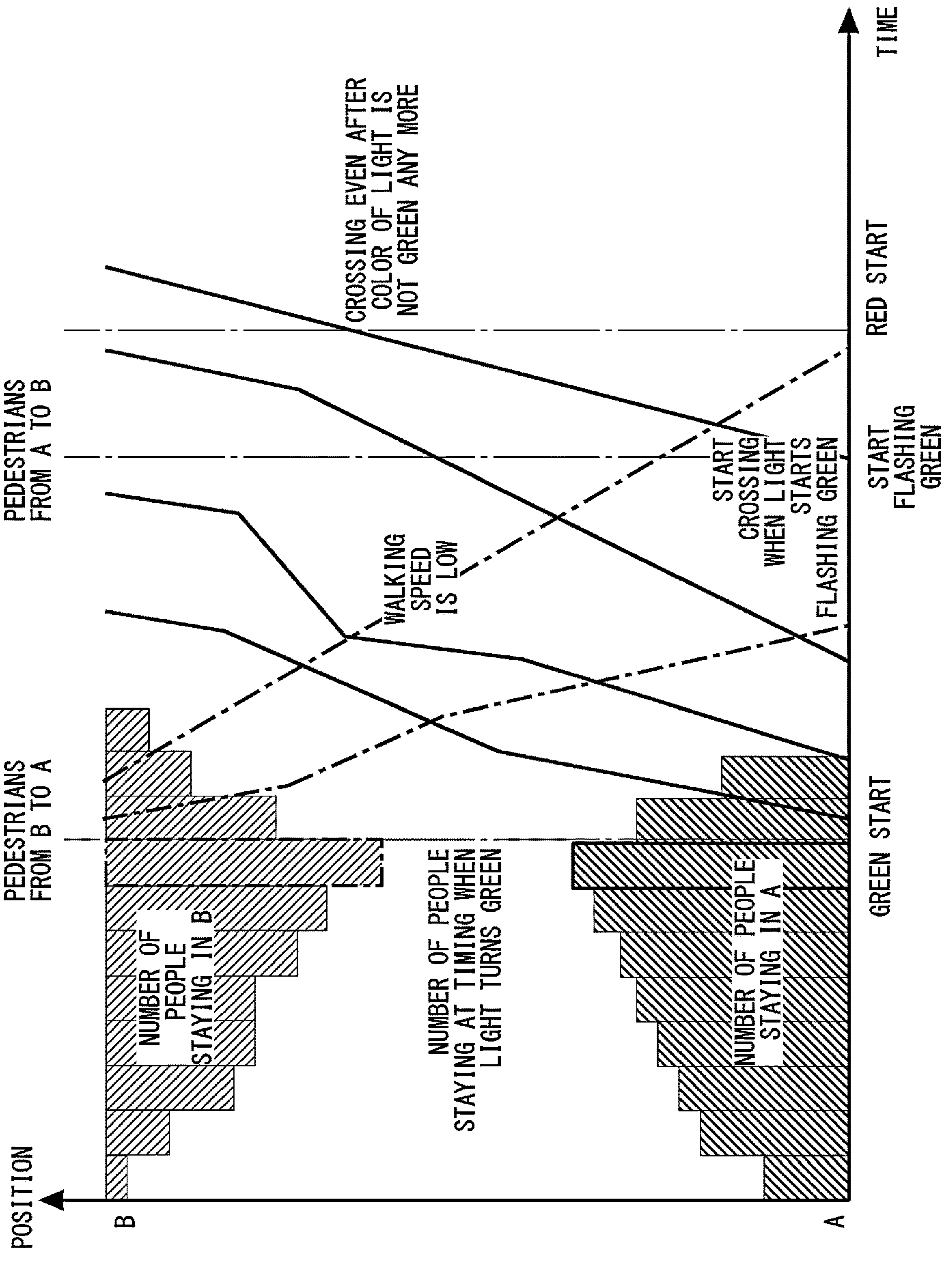
FIG. 6 is a time-space trajectory diagram of pedestrians in the crosswalk shown in FIG. 5.

The parameters for constructing the pedestrian model include the pedestrian traffic volume for each cycle, a time required for pedestrians to cross the crosswalk, etc. FIG. 6 is a time-space trajectory diagram of pedestrians in the crosswalk shown in FIG. 5. In FIG. 6, the horizontal axis indicates a time and the vertical axis indicates changes of positions of pedestrians over time. A lower side of the vertical axis corresponds to the place A in FIG. 5 and the upper side of the vertical axis corresponds to the place B of FIG. 5. FIG. 6 also shows a transition of the number of people staying at each of the place A and the place B at both ends of the crosswalk R3 over time.

By referring to FIG. 6, it is possible to acquire various parameters regarding pedestrians in the target intersection. For example, the pedestrian traffic volume for each cycle may be acquired for each direction. Note that the pedestrian traffic volume that is acquired may not only the pedestrian traffic volume during a time when the color of the traffic light is green but also the pedestrian traffic volume during a time when the traffic light is flashing green or during a time when the color of the traffic light is red. The second calculation unit 16 is able to acquire these parameters in an intersection that is a candidate for the introduction to construct a pedestrian model.

These traffic flow models are preferably constructed in such a way that the waiting time for each factor is reproduced. The waiting time for each factor includes, for example, besides a waiting time for vehicles which are about to turn right or left due to the pedestrian-vehicle encountering described above, a waiting time for vehicles traveling straight ahead stuck in a queue of vehicles that follow the vehicle that stops due to pedestrian-vehicle encountering, and a waiting time for vehicles traveling straight ahead impeded from traveling due to overflow of vehicles from the right-turn-only lane, a waiting time due to waiting for a traffic light to turn, or a waiting time for a car waiting to turn right due to waiting for oncoming straight-traveling vehicles to pass. The first calculation unit 12 is able to further calculate the waiting time due to waiting for a traffic light to turn, a waiting time for a car waiting to turn right due to waiting for oncoming straight-traveling vehicles to pass, or the like based on the data acquired by the sensor 20.

The second calculation unit 16 is able to construct, from the parameters that have been actually measured, a traffic flow model in such a way that the waiting time for each factor that has been actually measured and has been calculated by the aforementioned first calculation unit 12 is satisfied, and perform the traffic flow simulation using the constructed traffic flow model. The second calculation unit 16 is able to calculate each delay time for each factor when the pedestrian-vehicle separated signal control is applied to the intersection by the traffic simulation in which the actual traffic condition in the target intersection is taken into account and set the calculated value as the second evaluation index.

The evaluation unit 13 is able to obtain an evaluation value based on not only the first evaluation index calculated by the first calculation unit 12 but also the second evaluation index calculated by the second calculation unit 16. The evaluation unit 13 is able to calculate the evaluation value taking into consideration an index regarding safety, an index regarding efficiency, an index regarding services, and the like.

Regarding the index regarding safety, for example, the degree of recommendation of introduction of the pedestrian-vehicle separated signal control in intersections where accidents between vehicles and pedestrians often occur is high. Further, regarding the index regarding efficiency, for example, the degree of recommendation of introduction of the pedestrian-vehicle separated signal control in intersections where congestions of vehicles often occur is low since the introduction of pedestrian-vehicle separated signal control is likely to exacerbate congestion.

The index regarding service may include a waiting time for pedestrians to wait for the light to change. When, for example, a pedestrian wants to cross a normal cross intersection, which is not a scramble crossing, in a diagonal direction, he/she needs to cross roads twice. When the pedestrian-vehicle separated signal control is introduced in this intersection, pedestrians need to spend more time waiting for the traffic light to change, which causes the degree of recommendation of introduction of the pedestrian-vehicle separated signal control to decrease.

The evaluation unit 13 obtains the evaluation value based on the first evaluation value which is based on encountering of vehicles with pedestrians and the second evaluation value which is based on the above simulation result. The administrator of the introduction support system 100 is able to determine whether or not to introduce the pedestrian-vehicle separated signal control in an intersection that is a candidate for the introduction by referring to this evaluation value.

Figure 7:
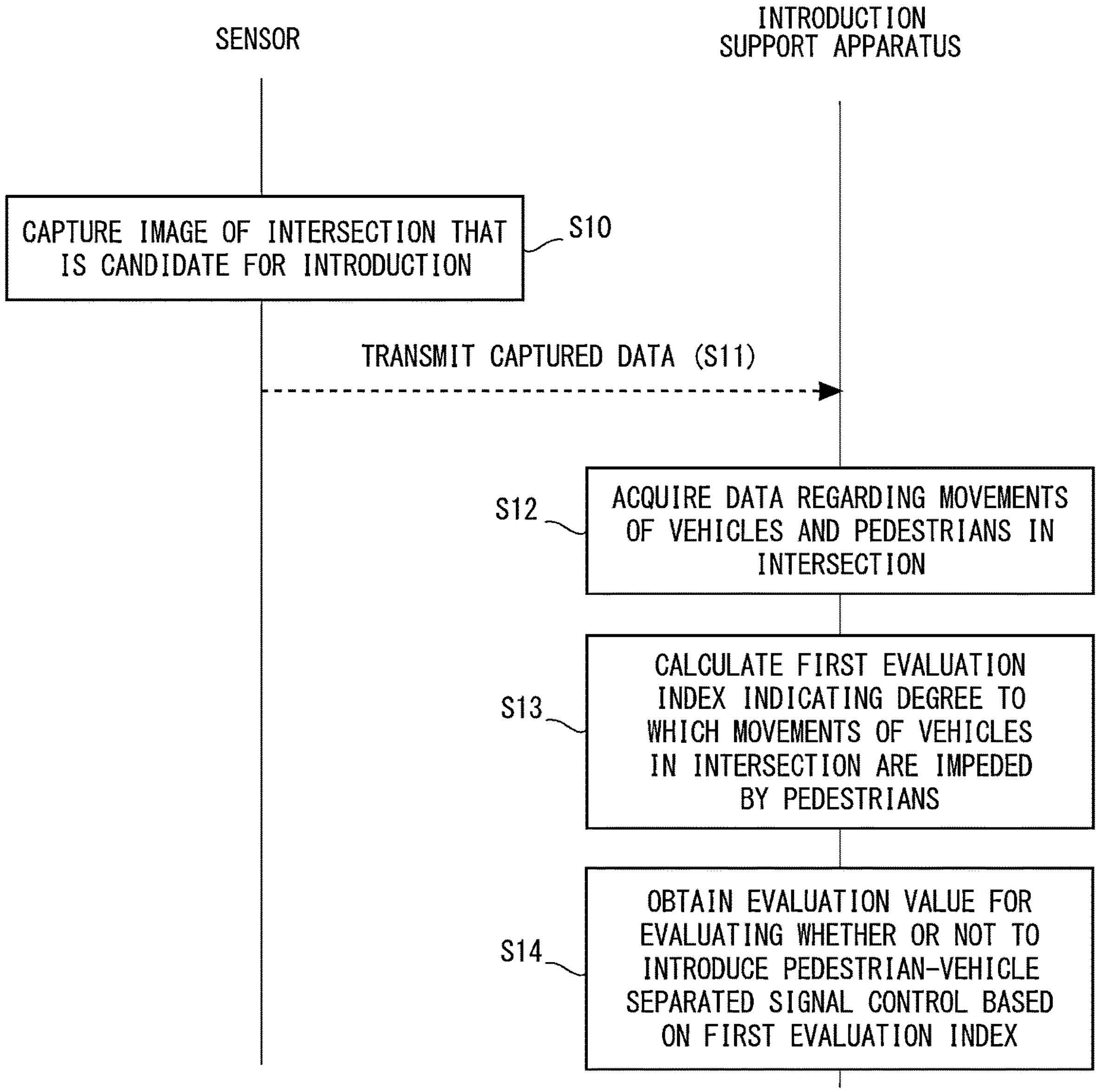
FIG. 7 is a sequence diagram for describing one example of a flow of processing in an introduction support system according to the example embodiment.

Referring now to FIG. 7, an introduction support method of the pedestrian-vehicle separated signal control according to the example embodiment will be described. FIG. 7 is a sequence diagram for describing one example of a flow of processing in the introduction support system according to the example embodiment. First, the sensor 20 captures an image of an intersection that is a candidate for the introduction (Step S10) and transmits video data to the introduction support apparatus 10 (Step S11). The data acquisition unit 11 of the introduction support apparatus 10 acquires data regarding movements of vehicles and pedestrians in the intersection from the video data (Step S12).

Then, the first calculation unit 12 calculates a first evaluation index indicating a degree to which movements of vehicles in the intersection are impeded by pedestrians based on the acquired data (Step S13). After that, the evaluation unit 13 obtains the evaluation value for evaluating whether or not to introduce the pedestrian-vehicle separated signal control based on the first evaluation index (Step S14). As described above, according to the example embodiment, it is possible to determine whether or not to introduce the pedestrian-vehicle separated signal control in an intersection that is a candidate for the introduction taking into consideration encountering of vehicles with pedestrians.

Further, the introduction support apparatus 10 may take into consideration the traffic condition of an adjacent intersection adjacent to the intersection that is the candidate for the introduction of pedestrian-vehicle separated signal control. The data acquisition unit 11 is able to further acquire data regarding movements of vehicles and pedestrians at the adjacent intersection adjacent to the intersection that is the candidate for the introduction. The first calculation unit 12 calculates a first evaluation for the adjacent intersection indicating a degree to which movements of vehicles in the adjacent intersection are impeded by pedestrians based on the data of the adjacent intersection. The evaluation unit 13 obtains the evaluation value based on the first evaluation value in the intersection that is the candidate for the introduction and the first evaluation index for the adjacent intersection.

The evaluation means may set the evaluation value to be large when both the first evaluation index in the intersection that is the candidate for the introduction and the first evaluation index for the adjacent intersection satisfy a predetermined condition. In the example embodiment, the first evaluation value is a total waiting time. Therefore, the evaluation means may set the evaluation value to be large when both the first evaluation index in the intersection that is the candidate for the introduction and the first evaluation index for the adjacent intersection are equal to or smaller than a predetermined threshold. Accordingly, it is possible to comprehensively determine whether or not to introduce the pedestrian-vehicle separated signal control taking into consideration the traffic condition in an intersection that is adjacent to an intersection that is a candidate for the introduction as well.

While the example in which the introduction support system 100 includes the introduction support apparatus 10 has been described in the example shown in FIG. 2, this configuration is merely an example. For example, the introduction support apparatus 10 may be implemented by a server that is installed at a data center or the like.

Note that each functional block that performs various kinds of processing shown in the drawings may be configured by a processor, a memory, or other circuits in terms of hardware. Further, the aforementioned processing may be implemented by causing a processor to execute the program. Accordingly, these functional blocks can be implemented in various forms by only hardware, only software or a combination thereof without any limitations.

The aforementioned program includes instructions (or software codes) that, when loaded into a computer, cause the computer to perform one or more of the functions described in the embodiments. The program may be stored in a non-transitory computer readable medium or a tangible storage medium. By way of example, and not a limitation, computer readable media or tangible storage media can include a random-access memory (RAM), a read-only memory (ROM), a flash memory, a solid-state drive (SSD) or other types of memory technologies, a CD-ROM, a digital versatile disc (DVD), a Blu-ray (registered trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

While the present disclosure has been described with reference to the example embodiments, the present disclosure is not limited to the above-described example embodiments. Various changes that may be understood by one skilled in the art may be made to the configurations and the details of the present disclosure within the scope of the present disclosure.

The whole or part of the example embodiments disclosed above can be described as, but not limited to, the following supplementary notes.

(Supplementary Note 1)

An introduction support apparatus of pedestrian-vehicle separated signal control, the introduction support apparatus comprising:

- data acquisition means for acquiring data regarding movements of vehicles and pedestrians within a measurement zone of an intersection that is a candidate for introduction of pedestrian-vehicle separated signal control;
- first calculation means for calculating a first evaluation index indicating a degree to which the movements of the vehicles in the intersection are impeded by the pedestrians based on the data acquired from the data acquisition means; and
- evaluation means for obtaining an evaluation value for evaluating whether or not to introduce the pedestrian-vehicle separated signal control based on the first evaluation index.

(Supplementary Note 2)

The introduction support apparatus of pedestrian-vehicle separated signal control according to Supplementary Note 1, wherein the first evaluation index is calculated based on statistics regarding an amount of a waiting time that vehicles which are about to turn right or left in the intersection have to wait because they are impeded from turning right or left due to the presence of pedestrians entering the intersection in a predetermined period of time.

(Supplementary Note 3)

The introduction support apparatus of pedestrian-vehicle separated signal control according to Supplementary Note 2, wherein the waiting time includes a waiting time for a vehicle which is about to turn right or left that stops since this vehicle is impeded from turning right or left due to the presence of the pedestrians entering the intersection, and a waiting time for subsequent vehicles traveling straight ahead that are impeded from traveling due to the presence of the stopped vehicle which is about to turn right or left.

(Supplementary Note 4)

The introduction support apparatus of pedestrian-vehicle separated signal control according to Supplementary Note 2 or 3, wherein

- the first evaluation index is a total waiting time in a predetermined period of time, and
- the evaluation means sets the evaluation value to be large when the total waiting time satisfies a predetermined condition.

(Supplementary Note 5)

The introduction support apparatus of pedestrian-vehicle separated signal control according to any one of Supplementary Notes 1 to 4, further comprising:

- second calculation means for calculating a second evaluation index when the pedestrian-vehicle separated signal control is introduced in the intersection by a traffic flow simulation,
- wherein the evaluation means changes the evaluation value based on the second evaluation index.

(Supplementary Note 6)

The introduction support apparatus of pedestrian-vehicle separated signal control according to any one of Supplementary Notes 1 to 5, wherein

- the data acquisition means further acquires data regarding movements of vehicles and pedestrians at an adjacent intersection that is adjacent to the intersection,
- the first calculation means calculates a first evaluation for the adjacent intersection indicating a degree to which the movements of the vehicles in the adjacent intersection are impeded by the pedestrians based on the data of the adjacent intersection, and
- the evaluation means obtains the evaluation value based on the first evaluation index in the intersection that is the candidate for the introduction and the first evaluation index for the adjacent intersection.

(Supplementary Note 7)

The introduction support apparatus of pedestrian-vehicle separated signal control according to Supplementary Note 6, wherein the evaluation means sets the evaluation value to be large when both the first evaluation index in the intersection that is the candidate for the introduction and the first evaluation index for the adjacent intersection satisfy a predetermined condition.

(Supplementary Note 8)

An introduction support method executed by a pedestrian-vehicle separated signal control introduction support apparatus, the introduction support method comprising:

- acquiring data regarding movements of vehicles and pedestrians within a measurement zone of an intersection that is a candidate for introduction of pedestrian-vehicle separated signal control;

calculating a first evaluation index indicating a degree to which the movements of the vehicles in the intersection are impeded by the pedestrians based on the acquired data; and obtaining an evaluation value for evaluating whether or not to introduce the pedestrian-vehicle separated signal control based on the first evaluation index.

(Supplementary Note 9)

The introduction support method according to Supplementary Note 8, wherein the first evaluation index is calculated based on statistics regarding an amount of a waiting time that vehicles which are about to turn right or left in the intersection have to wait because they are impeded from turning right or left due to the presence of pedestrians entering the intersection in a predetermined period of time.

(Supplementary Note 10)

The introduction support method according to Supplementary Note 9, wherein the waiting time includes a waiting time for a vehicle which is about to turn right or left that stops since this vehicle is impeded from turning right or left due to the presence of the pedestrians entering the intersection, and a waiting time for subsequent vehicles traveling straight ahead that are impeded from traveling due to the presence of the stopped vehicle which is about to turn right or left.

(Supplementary Note 11)

The introduction support method according to Supplementary Note 9 or 10, wherein the first evaluation index is a total waiting time in a predetermined period of time, and the evaluation value is set to be large when the total waiting time satisfies a predetermined condition.

(Supplementary Note 12)

The introduction support method according to any one of Supplementary Notes 8 to 11, comprising:

calculating a second evaluation index when the pedestrian-vehicle separated signal control is introduced in the intersection by a traffic flow simulation; and changing the evaluation value based on the second evaluation index.

(Supplementary Note 13)

The introduction support method according to any one of Supplementary Notes 8 to 12, comprising:

further acquiring data regarding movements of vehicles and pedestrians at an adjacent intersection that is adjacent to the intersection;

calculating a first evaluation for the adjacent intersection indicating a degree to which the movements of the vehicles in the adjacent intersection are impeded by the pedestrians based on the data of the adjacent intersection; and obtaining the evaluation value based on the first evaluation index in the intersection that is the candidate for the introduction and the first evaluation index for the adjacent intersection.

(Supplementary Note 14)

The introduction support method according to Supplementary Note 13, wherein the evaluation value is set to be large when both the first evaluation index in the intersection that is the candidate for the introduction and the first evaluation index for the adjacent intersection satisfy a predetermined condition.

(Supplementary Note 15)

A non-transitory computer readable medium storing a program causing a computer to execute processing for:

acquiring data regarding movements of vehicles and pedestrians within a measurement zone of an intersection that is a candidate for introduction of pedestrian-vehicle separated signal control;

calculating a first evaluation index indicating a degree to which the movements of the vehicles in the intersection are impeded by the pedestrians based on the acquired data; and obtaining an evaluation value for evaluating whether or not to introduce the pedestrian-vehicle separated signal control based on the first evaluation index.

(Supplementary Note 16)

The non-transitory computer readable medium according to Supplementary Note 15, wherein the first evaluation index is calculated based on statistics regarding an amount of a waiting time that vehicles which are about to turn right or left in the intersection have to wait because they are impeded from turning right or left due to the presence of pedestrians entering the intersection in a predetermined period of time.

(Supplementary Note 17)

The non-transitory computer readable medium according to Supplementary Note 16, wherein the waiting time includes a waiting time for a vehicle which is about to turn right or left that stops since this vehicle is impeded from turning right or left due to the presence of the pedestrians entering the intersection, and a waiting time for subsequent vehicles traveling straight ahead that are impeded from traveling due to the presence of the stopped vehicle which is about to turn right or left.

(Supplementary Note 18)

The non-transitory computer readable medium according to Supplementary Note 16 or 17, wherein the first evaluation index is a total waiting time in a predetermined period of time, and the evaluation value is set to be large when the total waiting time satisfies a predetermined condition.

(Supplementary Note 19)

The non-transitory computer readable medium according to any one of Supplementary Notes 15 to 18, comprising:

calculating a second evaluation index when the pedestrian-vehicle separated signal control is introduced in the intersection by a traffic flow simulation; and changing the evaluation value based on the second evaluation index.

(Supplementary Note 20)

The non-transitory computer readable medium according to any one of Supplementary Notes 15 to 19, comprising:

further acquiring data regarding movements of vehicles and pedestrians at an adjacent intersection that is adjacent to the intersection;

calculating a first evaluation for the adjacent intersection indicating a degree to which the movements of the vehicles in the adjacent intersection are impeded by the pedestrians based on the data of the adjacent intersection; and obtaining the evaluation value based on the first evaluation index in the intersection that is the candidate for the introduction and the first evaluation index for the adjacent intersection.

(Supplementary Note 21)

The non-transitory computer readable medium according to Supplementary Note 20, wherein the evaluation value is set to be large when both the first evaluation index in the intersection that is the candidate for the introduction and the first evaluation index for the adjacent intersection satisfy a predetermined condition.

REFERENCE SIGNS LIST

10 INTRODUCTION SUPPORT APPARATUS
11 DATA ACQUISITION UNIT
12 FIRST CALCULATION UNIT
13 EVALUATION UNIT
14 STORAGE UNIT
15 OUTPUT UNIT
16 SECOND CALCULATION UNIT
20 SENSOR
21 DISPLAY DEVICE
100 INTRODUCTION SUPPORT SYSTEM
R1 FIRST ROAD
R2 SECOND ROAD
R3 CROSSWALK
L1 FIRST LANE
L2 SECOND LANE
L3 THIRD LANE
L4 FOURTH LANE
T1 TRAFFIC LIGHT FOR VEHICLES
T2 TRAFFIC LIGHT FOR PEDESTRIANS

The invention claimed is:

1. An introduction support apparatus of pedestrian-vehicle separated signal control, the introduction support apparatus comprising:

at least one sensor;

at least one memory storing instructions, and at least one processor configured to execute the instructions to;

acquire, based on data captured by the at least one sensor, data regarding movements of vehicles and pedestrians within a measurement zone of an intersection that is a candidate for introduction of pedestrian-vehicle separated signal control;

calculate a first evaluation index indicating a degree to which the movements of the vehicles in the intersection are impeded by the pedestrians based on the acquired data; and obtain an evaluation value for evaluating whether or not to introduce the pedestrian-vehicle separated signal control based on the first evaluation index, wherein the first evaluation index is calculated based on statistics regarding an amount of a waiting time that vehicles which are about to turn right or left in the intersection have to wait because they are impeded from turning right or left due to the presence of pedestrians entering the intersection in a predetermined period of time, and wherein the waiting time includes a waiting time for a vehicle which is about to turn right or left that stops based on the vehicle being impeded from turning right or left due to the presence of the pedestrians entering the intersection, and a waiting time for subsequent vehicles traveling straight ahead that are impeded from traveling due to the presence of the stopped vehicle which is about to turn right or left.

2. The introduction support apparatus of the pedestrian-vehicle separated signal control according to claim 1, wherein the first evaluation index is a total waiting time in a predetermined period of time, and the at least one processer is further configured to execute the instructions to set the evaluation value to be large when the total waiting time satisfies a predetermined condition.

3. The introduction support apparatus of the pedestrian-vehicle separated signal control according to claim 1, wherein the at least one processer is further configured to execute the instructions to calculate a second evaluation index when the pedestrian-vehicle separated signal control is introduced in the intersection by a traffic flow simulation, and the evaluation value is changed based on the second evaluation index.

4. The introduction support apparatus of the pedestrian-vehicle separated signal control according to claim 1, wherein the at least one processer is further configured to execute the instructions to acquire data regarding movements of vehicles and pedestrians at an adjacent intersection that is adjacent to the intersection, calculate a first evaluation for the adjacent intersection indicating a degree to which the movements of the vehicles in the adjacent intersection are impeded by the pedestrians based on the data of the adjacent intersection, and obtain the evaluation value based on the first evaluation index in the intersection that is the candidate for the introduction and the first evaluation index for the adjacent intersection.

5. The introduction support apparatus of the pedestrian-vehicle separated signal control according to claim 4, wherein the at least one processer is further configured to execute the instructions to set the evaluation value to be large when both the first evaluation index in the intersection that is the candidate for the introduction and the first evaluation index for the adjacent intersection satisfy a predetermined condition.

6. An introduction support method executed by a pedestrian-vehicle separated signal control introduction support apparatus including a computer, the method comprising:

acquiring, based on data captured by at least one sensor, data regarding movements of vehicles and pedestrians within a measurement zone of an intersection that is a candidate for introduction of pedestrian-vehicle separated signal control;

calculating a first evaluation index indicating a degree to which the movements of the vehicles in the intersection are impeded by the pedestrians based on the acquired data; and obtaining an evaluation value for evaluating whether or not to introduce the pedestrian-vehicle separated signal control based on the first evaluation index, wherein the first evaluation index is calculated based on statistics regarding an amount of a waiting time that vehicles which are about to turn right or left in the intersection have to wait because they are impeded from turning right or left due to the presence of pedestrians entering the intersection in a predetermined period of time, and wherein the waiting time includes a waiting time for a vehicle which is about to turn right or left that stops since this vehicle is impeded from turning right or left due to the presence of the pedestrians entering the intersection, and a waiting time for subsequent vehicles traveling straight ahead that are impeded from traveling due to the presence of the stopped vehicle which is about to turn right or left.

7. The introduction support method according to claim 6, wherein the first evaluation index is a total waiting time in a predetermined period of time, and the evaluation value is set to be large when the total waiting time satisfies a predetermined condition.

8. The introduction support method according to claim 6, further comprising:

calculating a second evaluation index when the pedestrian-vehicle separated signal control is introduced in the intersection by a traffic flow simulation; and changing the evaluation value based on the second evaluation index.

9. The introduction support method according to claim 6, further comprising:

further acquiring data regarding movements of vehicles and pedestrians at an adjacent intersection that is adjacent to the intersection;

calculating a first evaluation for the adjacent intersection indicating a degree to which the movements of the vehicles in the adjacent intersection are impeded by the pedestrians based on the data of the adjacent intersection; and obtaining the evaluation value based on the first evaluation index in the intersection that is the candidate for the introduction and the first evaluation index for the adjacent intersection.

10. The introduction support method according to claim 9, wherein the evaluation value is set to be large when both the first evaluation index in the intersection that is the candidate for the introduction and the first evaluation index for the adjacent intersection satisfy a predetermined condition.

11. A non-transitory computer readable medium storing a program causing a computer to execute processing for:

acquiring, based on data captured by at least one sensor, data regarding movements of vehicles and pedestrians within a measurement zone of an intersection that is a candidate for introduction of pedestrian-vehicle separated signal control;

calculating a first evaluation index indicating a degree to which the movements of the vehicles in the intersection are impeded by the pedestrians based on the acquired data; and obtaining an evaluation value for evaluating whether or not to introduce the pedestrian-vehicle separated signal control based on the first evaluation index, wherein the first evaluation index is calculated based on statistics regarding an amount of a waiting time that vehicles which are about to turn right or left in the intersection have to wait because they are impeded from turning right or left due to the presence of pedestrians entering the intersection in a predetermined period of time, and wherein the waiting time includes a waiting time for a vehicle which is about to turn right or left that stops since this vehicle is impeded from turning right or left due to the presence of the pedestrians entering the intersection, and a waiting time for subsequent vehicles traveling straight ahead that are impeded from traveling due to the presence of the stopped vehicle which is about to turn right or left.

12. The non-transitory computer readable medium according to claim 11, wherein the first evaluation index is a total waiting time in a predetermined period of time, and the evaluation value is set to be large when the total waiting time satisfies a predetermined condition.

13. The non-transitory computer readable medium according to claim 11, comprising:

calculating a second evaluation index when the pedestrian-vehicle separated signal control is introduced in the intersection by a traffic flow simulation; and changing the evaluation value based on the second evaluation index.

14. The non-transitory computer readable medium according to claim 11, comprising:

further acquiring data regarding movements of vehicles and pedestrians at an adjacent intersection that is adjacent to the intersection;

calculating a first evaluation for the adjacent intersection indicating a degree to which the movements of the vehicles in the adjacent intersection are impeded by the pedestrians based on the data of the adjacent intersection; and obtaining the evaluation value based on the first evaluation index in the intersection that is the candidate for the introduction and the first evaluation index for the adjacent intersection.

15. The introduction support apparatus of the pedestrian-vehicle separated signal control according to claim 1, wherein the at least one sensor comprises a camera.

16. The introduction support apparatus of the pedestrian-vehicle separated signal control according to claim 1, wherein the at least one sensor comprises a camera and the at least one processor is further configured to execute the instructions to acquire the data regarding movements of the vehicles and the pedestrians using video data captured by the camera.

* * * * *